United States Patent
Kern et al.

(10) Patent No.: US 7,933,967 B2
(45) Date of Patent: Apr. 26, 2011

(54) SIMULTANEOUS SHARING OF STORAGE DRIVES ON BLADE CENTER

(75) Inventors: Eric R. Kern, Durham, NC (US);
Brandon J. Ellison, Raleigh, NC (US);
James A. Day, Jr., Durham, NC (US);
Shane M. Lardinois, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2695 days.

(21) Appl. No.: 10/606,392

(22) Filed: Jun. 25, 2003

(65) Prior Publication Data
US 2005/0021654 A1 Jan. 27, 2005

(51) Int. Cl.
*G06F 15/167* (2006.01)
(52) U.S. Cl. ...................................................... 709/216
(58) Field of Classification Search .................. 709/216, 709/220, 248, 226
See application file for complete search history.

(56) References Cited

U.S. PATENT DOCUMENTS

| | | | |
|---|---|---|---|
| 6,058,434 A | 5/2000 | Wilt et al. | 709/300 |
| 6,334,148 B1 | 12/2001 | Sandström | 709/219 |
| 6,389,464 B1 | 5/2002 | Krishnamurthy et al. | 709/220 |
| 6,493,348 B1 | 12/2002 | Gelman et al. | 370/401 |
| 6,975,581 B1* | 12/2005 | Medina et al. | 370/401 |
| 2002/0124114 A1* | 9/2002 | Bottom et al. | 709/251 |
| 2003/0033517 A1* | 2/2003 | Rutherglen et al. | 713/153 |
| 2004/0181601 A1* | 9/2004 | Sakthikumar | 709/229 |

* cited by examiner

*Primary Examiner* — Benjamin R Bruckart
(74) *Attorney, Agent, or Firm* — Cythia G. Seal; Jeffrey L. Streets

(57) ABSTRACT

A method and system in accordance with the present invention provides a microprocessor on each blade server for providing interfaces at the plurality of blade servers for simultaneous connection with a local or remote drive. The microprocessor can also configure the blade server to simultaneously connect with a plurality of local and/or remote drives. The microprocessor routes data packets between a management system and its respective blade server, while a management module in the management system manages the simultaneous access of the drive(s) by the plurality of blade servers or the plurality of drives by a blade server. This increases the efficiency of the system.

14 Claims, 8 Drawing Sheets

SIMULTANEOUS SHARING OF STORAGE DRIVES ON BLADE CENTER

FIELD OF THE INVENTION

The present invention relates to blade centers, and more particularly, to the sharing of storage drives on blade centers.

BACKGROUND OF THE INVENTION

Blade servers are known in the art. For example, a Blade Center provided by International Business Machines Corporation™ comprises fourteen independent blade servers, connected across a backplane through an Ethernet switch. FIG. 1 illustrates a conventional Blade Center. The Blade Center comprises a plurality of blade servers 102a-102c managed by a management system 104. The blade servers 102a-102c and the management system 104 communicate via a bus according to the Virtual Local Area Network (VLAN) protocol. The management system 104 comprises an Ethernet switch 106 and a management module 108. The management module 108 manages communication between the blade servers 102a-102c or between the blade servers 102a-102c and an Ethernet network 110. The Ethernet switch 106 routes packets between the management module 108 and the appropriate blade server 102a-102c, or between the Ethernet network 110 and the appropriate blade server 102a-102c.

However, with the conventional Blade Center, only one of the blade servers 102a-102c can connect with a local drive 112 or a remote drive 114 at a time. For a different blade server to connect with the local 112 or remote 114 drive, the blade server currently connected must first be disconnected. This is inefficient and cumbersome.

Accordingly, there exists a need for a method and system for providing simultaneous connection between at least one drive and at least one blade server. The method and system should allow a plurality of blade servers to simultaneously connect with one or more drives. It should also allow the same drive to simultaneously connect with a plurality of blade servers. The present invention addresses such a need.

SUMMARY OF THE INVENTION

A method and system in accordance with the present invention provides a microprocessor on each blade server for providing interfaces at the plurality of blade servers for simultaneous connection with a local or remote drive. The microprocessor can also configure the blade server to simultaneously connect with a plurality of local and/or remote drives. The microprocessor routes data packets between a management system and its respective blade server, while a management module in the management system manages the simultaneous access of the drive(s) by the plurality of blade servers or the plurality of drives by a blade server. This increases the efficiency of the system.

DETAILED DESCRIPTION

The present invention provides a method and system for providing simultaneous connection between at least one drive and at least one blade server. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 8 in conjunction with the discussion below.

Figure 1:
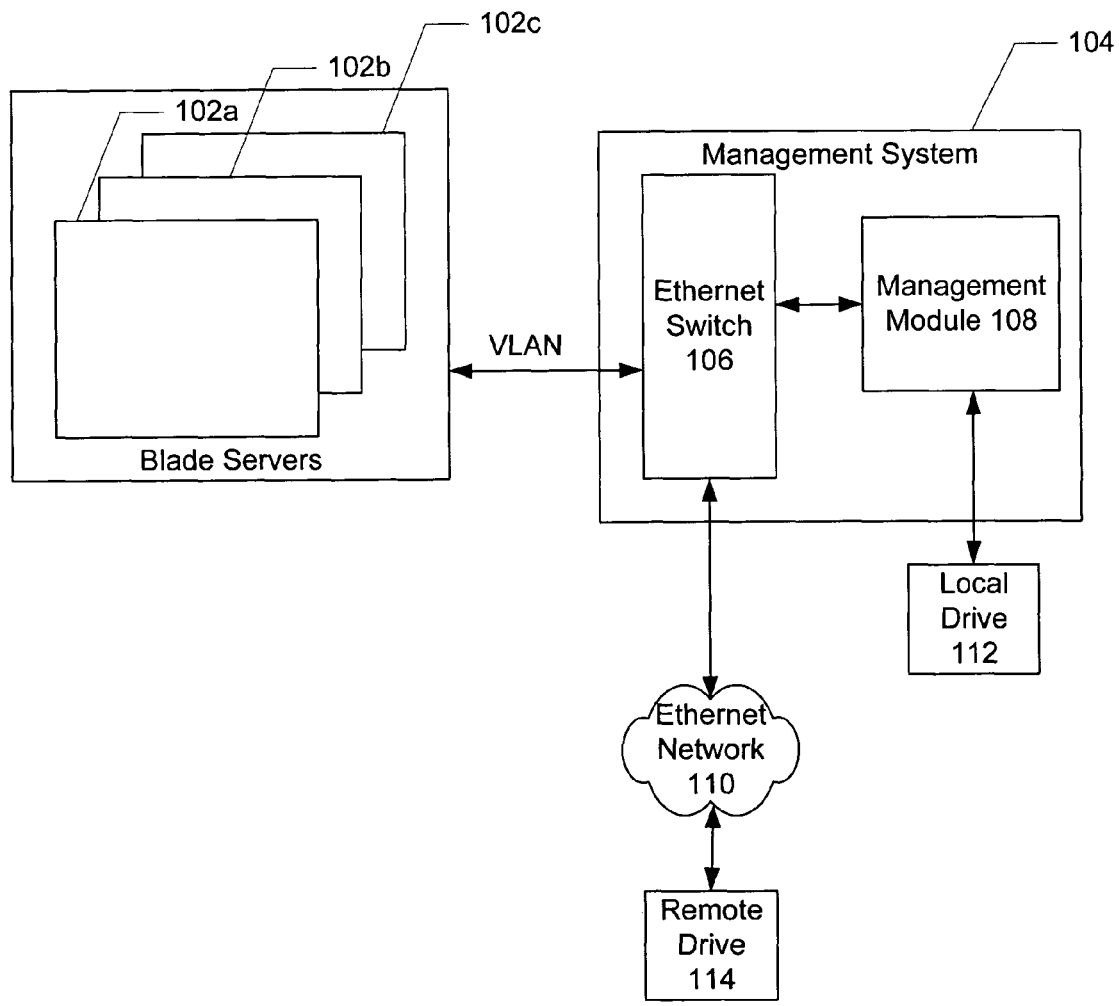
FIG. 1 illustrates a conventional Blade Center.
Figure 2:
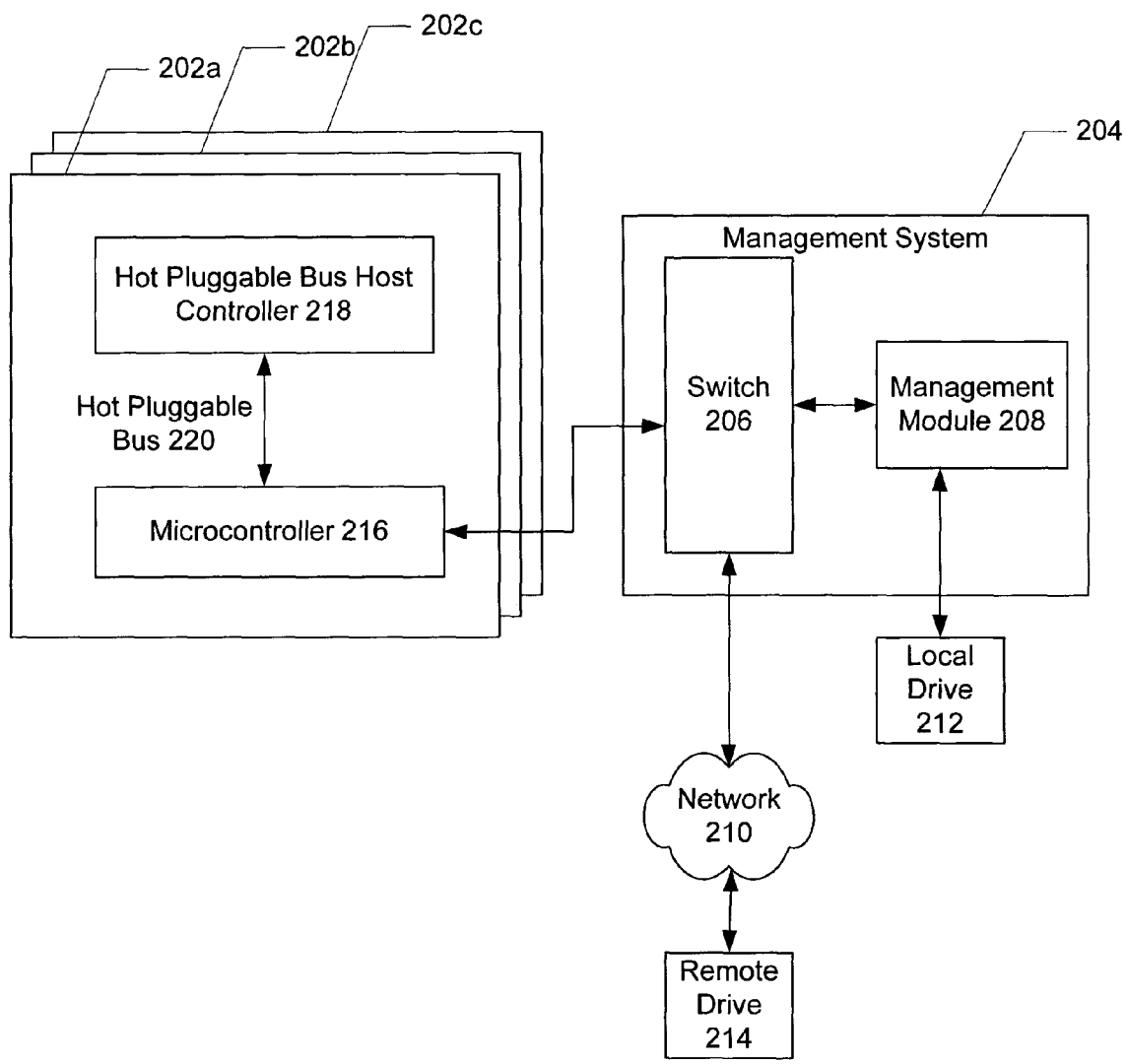
FIG. 2 illustrates a preferred embodiment of a system for providing simultaneous connection between at least one drive and at least one blade server in accordance with the present invention.

FIG. 2 illustrates a preferred embodiment of a system for providing simultaneous connection between at least one drive and at least one blade server in accordance with the present invention. The system comprises a plurality of blade servers 202a-202c connected to a management system 204 in the backplane. The management system 204 comprises a switch 206 and a management module 208. At least one local drive 212 can be coupled to the management module 208. At least one remote drive 214 can also be coupled to the management module 208 through a network 210 and the switch 206. The management module 208 manages the communications among the blade servers 202a-202c, as well as between the blade servers 202a-202c and the drives connected to the system, including both the local and remote drives 212 and 214. In the preferred embodiment, the local 212 and/or the remote drive 214 are storage drives, such as CDROM drives or diskette drives. Other types of drives may be possible.

Each blade server 202a-202c comprises a microcontroller 216, a hot pluggable bus host controller 218, and a hot pluggable bus 220. The host controller 218 provides an interface to other components of its blade server. The microcontroller 216 routes data packets between the management system 204 and the host controller 218 via the switch 206. The microcontroller 216 is also capable of configuring an interface for the host controller 218 to communicate with the local drive 212 or remote drive 214. Because this functionality resides independently on each blade server 202a-202c, a plurality of blade servers can connect simultaneously with the same drive. Similarly, each blade 202a-202c server can simultaneously connect with a plurality of drives.

Figure 3:
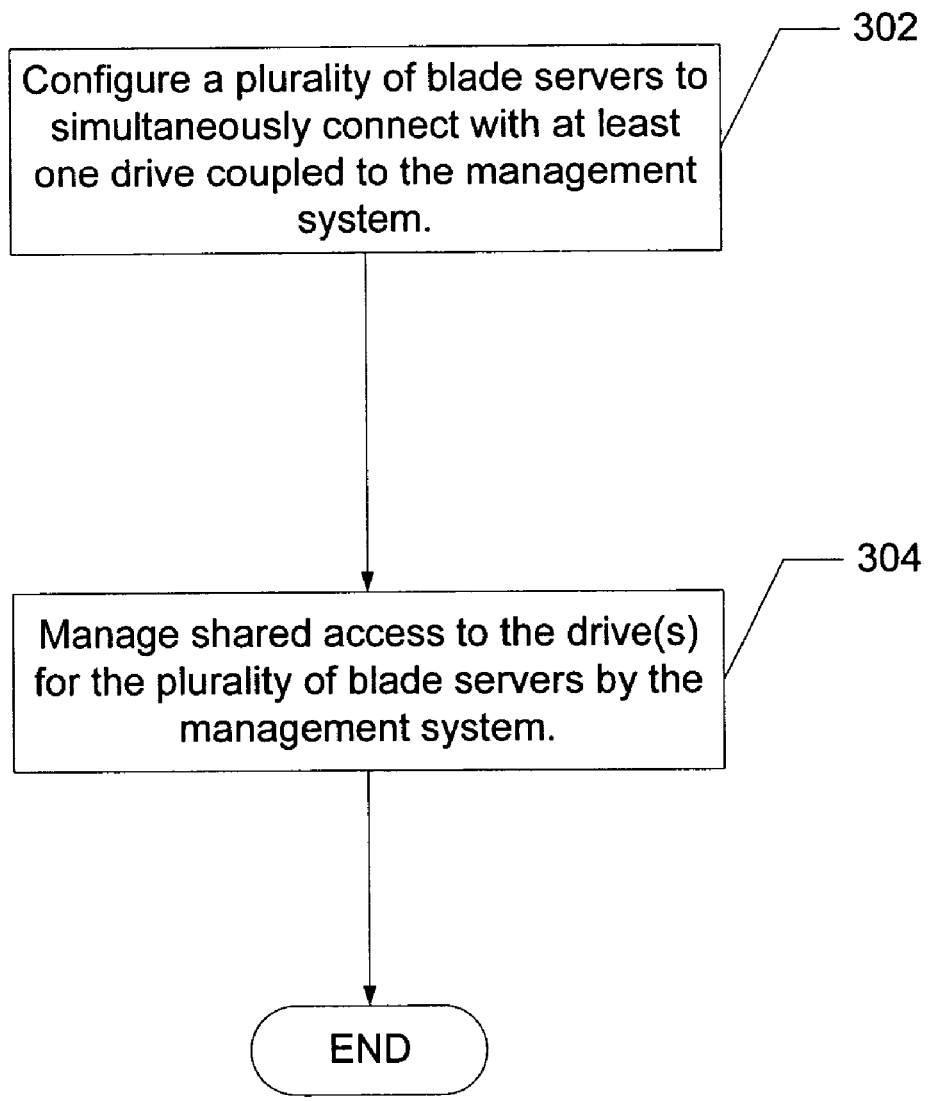
FIG. 3 is a flowchart illustrating a preferred embodiment of a method for providing simultaneous connection between at least one drive and a plurality of blade servers in accordance with the present invention.

FIG. 3 is a flowchart illustrating a preferred embodiment of a method for providing simultaneous connection between at least one drive and a plurality of blade servers in accordance with the present invention. First, a plurality of blade servers 202a-202c are configured to simultaneously connect with at least one drive coupled to the management system 204, via step 302. The drive(s) can be either the local drive 212 and/or the remote drive 214. In the preferred embodiment, the microprocessor 216 for the plurality of blade servers 202a-202c configures the interfaces to their respective host controllers 218 for connection with the local drive 212 and/or the remote drive 214. The microprocessor 216 for each blade server routes data packets between the management system 204 and the host processor 218. Then, the management system 204, and more particularly the management module 208, manages the shared access to the drive(s) for the plurality of blade servers 202a-202c, via step 304.

Figure 4:
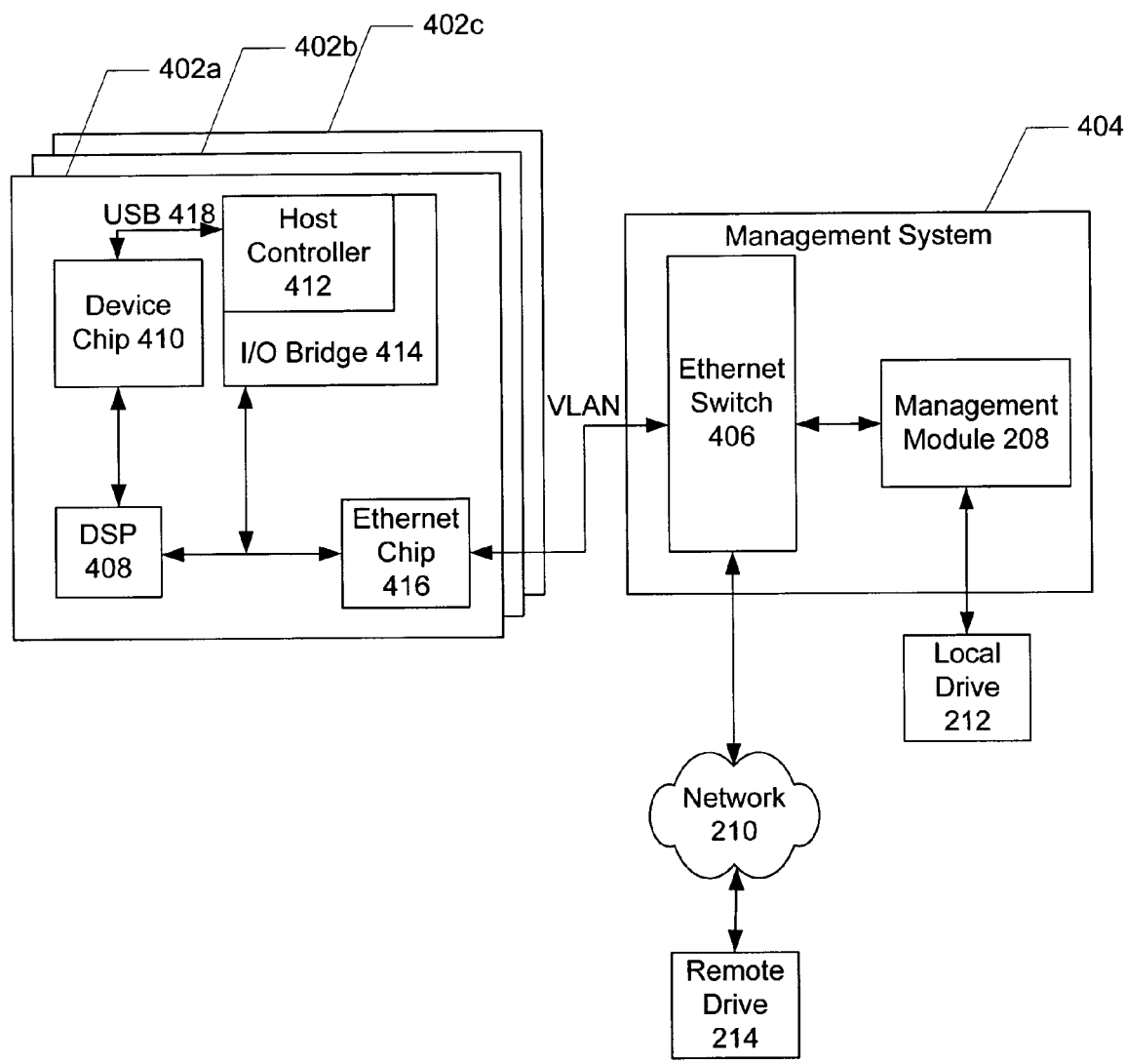
FIG. 4 illustrates in more detail a preferred embodiment of a system for providing simultaneous connection between at least one drive and a plurality of blade servers in accordance with the present invention.

FIG. 4 illustrates in more detail a preferred embodiment of a system for providing simultaneous connection between at least one drive and a plurality of blade servers in accordance with the present invention. In this preferred embodiment, the switch 206 is an Ethernet switch 406, which communicates with a plurality of blade servers 402a-402c via an Ethernet chip 416 on each blade server 402a-402c according to the Virtual Local Area Network (VLAN) standard. The VLAN standard is known in the art and will not be described here. The functions of the microprocessor 216 are performed by a digital signal processor (DSP) 408 and a device chip 410 on each blade server 402a-402c. The hot pluggable bus 220 is a Universal Serial Bus (USB) 418. In the preferred embodiment, the host controller 412 resides on an Input/Output (I/O) bridge 414. The DSP 408 routes data packets between the management system 404 and device chip 410. The DSP 408 configures the device chip 410 of its blade server to present the interface for the local drive 212 and/or the remote drive 214 to the host controller 412. Alternatively, the function of the DSPs 408 can be performed by a chip (not shown) at the management system 404. Because each blade server 402a-402c has its own device chip 410, a plurality of blade servers can simultaneously connect with the same drives, and each blade server can simultaneously connect with a plurality of drives.

Figure 5:
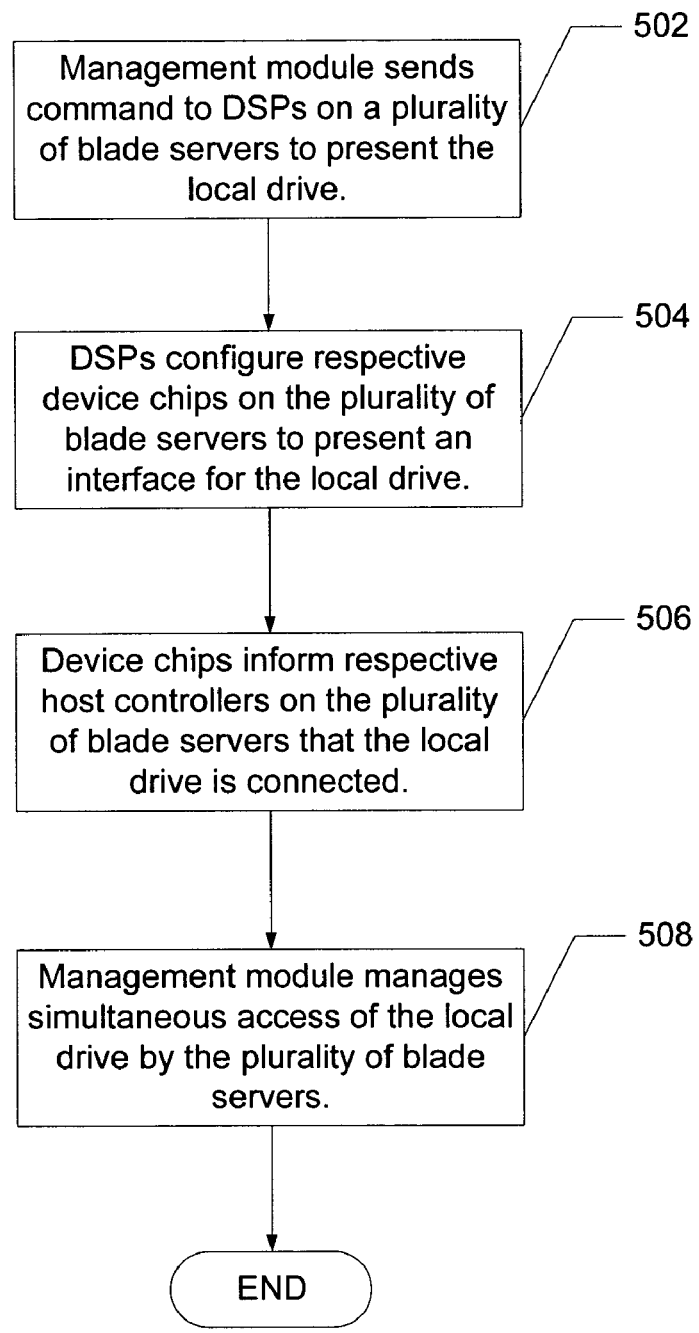
FIG. 5 is a flowchart illustrating in more detail the method for providing simultaneous connection between at least one local drive and a plurality of blade servers in accordance with the present invention.

FIG. 5 is a flowchart illustrating in more detail the method for providing simultaneous connection between at least one local drive and a plurality of blade servers in accordance with the present invention. First, the management module 208 sends a command to the DSPs 408 on a plurality of blade servers 402a-402c to present the local drive(s) 212, via step 502. Next, the DSPs 408 configure the respective device chips 410 on the plurality of blade servers 402a-402c to present an interface for the local drive 212, via step 504. Each device chip 410 informs their respective host controllers 412 on the plurality of blade servers 402a-402c that the local drive 212 is connected, via step 506. Each of the plurality of blade servers 402a-402b can now simultaneously connect with the local drive 212. The management module 208 manages the simultaneous access of the local drive 212 by the plurality of blade servers 402a-402c, via step 508.

In accessing the local drive 212, a data packet from the local drive 212 is sent to the management module 208. The management module 208 sends the data packet to the intended blade server via the Ethernet switch 406. The Ethernet switch 406 delivers the data packet to the DSP 408 of the intended blade server via the Ethernet chip 416 on that blade server. The DSP 408 routes the data packet through the device chip 410 to the host controller 412 via the previously configured interface for the local drive 212. Data packets from the blade server to the local drive 212 travel the same return path.

Figure 6:
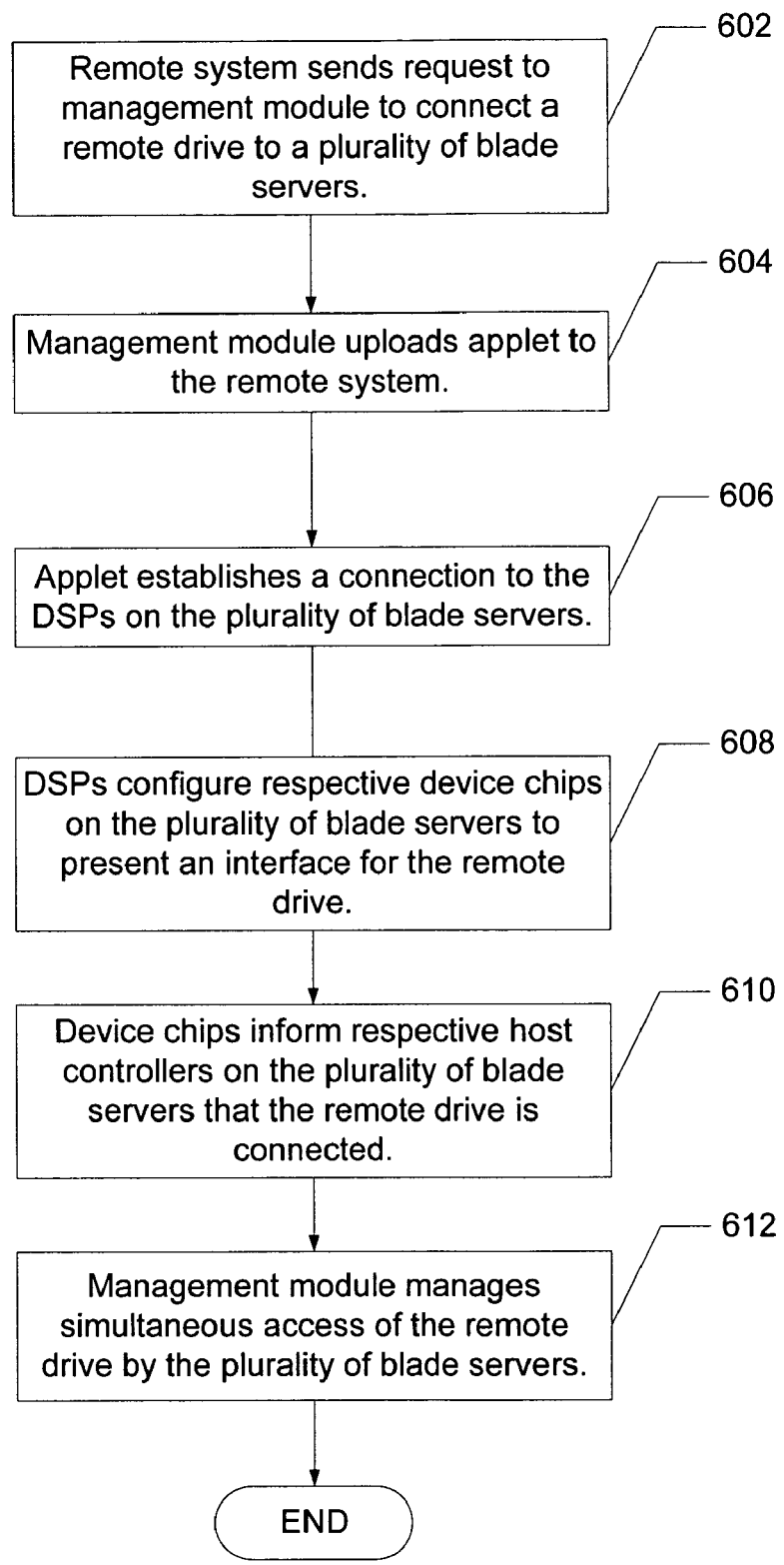
FIG. 6 is a flowchart illustrating the method for providing simultaneous connection between at least one remote drive and a plurality of blade servers in accordance with the present invention.

FIG. 6 is a flowchart illustrating the method for providing simultaneous connection between at least one remote drive and a plurality of blade servers in accordance with the present invention. First, the remote system (not shown), to which the remote drive 214 is coupled, sends a request to the management module 208 to connect the remote drive 214 to a plurality of blade servers 404a-404c, via step 602. The management module 208 then uploads an applet to the remote system, via step 604, if the applet does not already exist on the remote system. The applet is used to establish a connection to the DSPs 408 on the plurality of blade servers 402a-402c, via step 606. The DSPs 408 on the plurality of blade servers 402a-402c configure their respective device chips 410 on the plurality of blade servers 402a-402c to present an interface for the remote drive 214, via step 608. The device chips 410 inform their respective host controllers 412 on the plurality of blade servers 402a-402c that the remote drive 214 is connected, via step 610. The management module 208 then manages the simultaneous access of the remote drive 214 by the plurality of blade servers 402a-402c, via step 612.

In accessing the remote drive 214, a data packet from the remote drive 214 is sent to the Ethernet switch 406 through the connection established by the applet. The Ethernet switch 406 sends the data packet to the management module 208. The management module 208 then sends the data packet to the intended blade server via the Ethernet switch 406. The Ethernet switch 406 delivers the data packet to the DSP 408 of the intended blade server via the Ethernet chip 416 on that blade server. The DSP 408 routes the data packet through the device chip 410 to the host controller 412 via the previously configured interface for the remote drive 214. Data packets from the blade server to the remote drive 214 travel the same return path.

Figure 7:
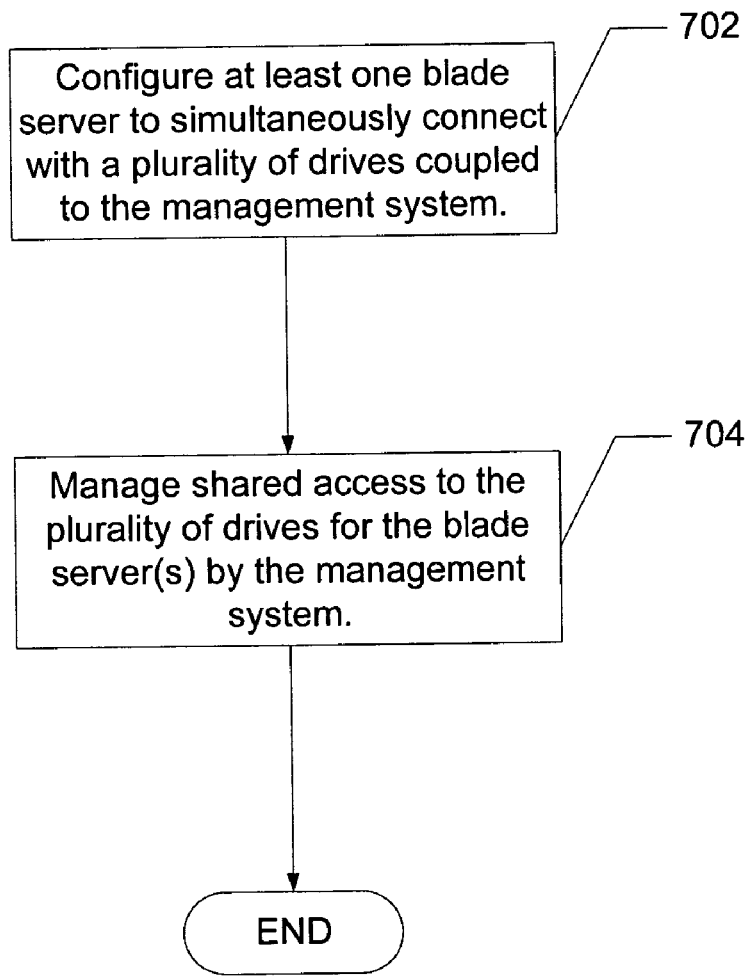
FIG. 7 is a flowchart illustrating a preferred embodiment of a method for simultaneous connection between at least one blade server and a plurality of drives in accordance with the present invention.

In accordance with the present invention, a plurality of blade servers can also simultaneously connect with the same local or remote drive. FIG. 7 is a flowchart illustrating a preferred embodiment of a method for simultaneous connection between at least one blade server and a plurality of drives in accordance with the present invention. At least one blade server is configured to simultaneously connect with a plurality of drives coupled to the management system 204, via step 702. The plurality of drives can be a plurality of local drives 212, a plurality of remote drives 214, or a combination of local drive(s) and remote drive(s). The microprocessor 216 for the blade server(s) configures the interface to its host controller 218 for connection with the plurality of drives. The microprocessor 216 for the blade server(s) routes data packets between the management system 204 and the plurality of drives via the switch 206. Then, the management system 204, and more particularly the management module 208, manages the shared access to the plurality of drive(s) for the blade server(s), via step 704.

Figure 8:
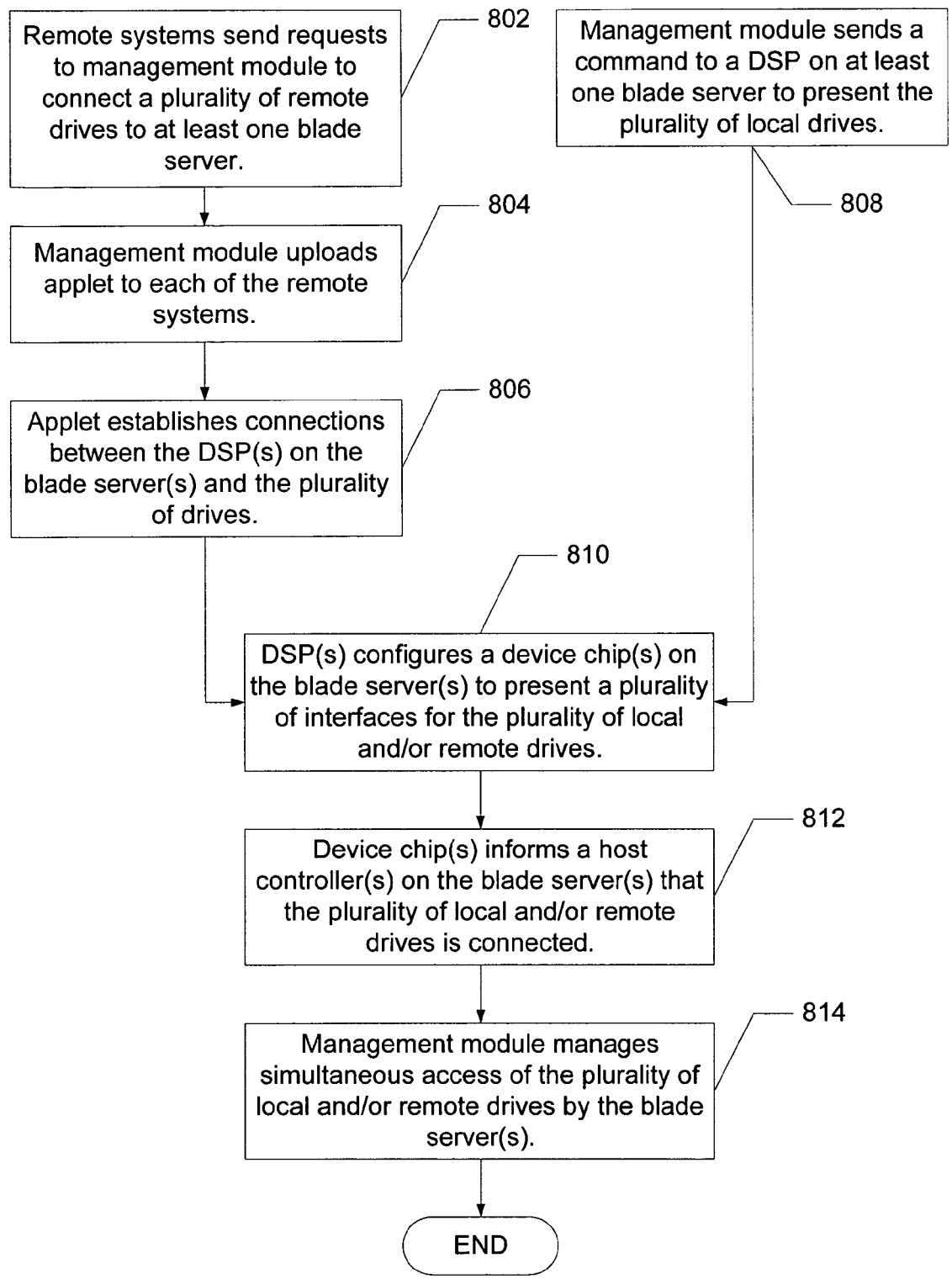
FIG. 8 is a flowchart illustrating in more detail the method for providing simultaneous connection between at least one blade server and a plurality of drives in accordance with the present invention.

FIG. 8 is a flowchart illustrating in more detail the method for providing simultaneous connection between at least one blade server and a plurality of drives in accordance with the present invention. Referring to both FIGS. 4 and 8, for the plurality of drives that are remote drives 214, the remote systems (not shown) to which the remote drives 214 are connected sends requests to the management module 208 to connect the plurality of remote drives 214 to the blade server (s), via step 802. The management module 208 uploads an applet to each of the remote systems, via step 804, if the applet does not already exist on a remote system. The applet establishes connections between the DSP(s) 408 on the blade server(s) and the plurality of remote drives 214, via step 806. For the plurality of drives that are local drives 212, the management module 208 sends a command to the DSP(s) 408 on the blade server(s) to present the plurality of local drives, via step 808.

Then, the DSP(s) 408 on the blade server(s) configures a device chip(s) 410 on the blade server(s) to present a plurality of interfaces for the plurality of local and/or remote drives, via step 810. The device chip(s) 410 informs the host controller(s) 412 on the blade server(s) that the plurality of local and/or remote drives is connected, via step 812. The DSP(s) 408 routes connect/disconnect events of the plurality of local and/or remote drives to the device chip 410 so that the interfaces could appear and disappear as appropriate. The management module 208 then manages the simultaneous access of the plurality of local and/or remote drives by the blade server(s), via step 814.

A method and system for providing simultaneous access between at least one drive and a plurality of blade servers have been disclosed. The method and system provides a microprocessor on each blade server for providing interfaces at the plurality of blade servers for simultaneous connection with a local or remote drive. The microprocessor can also configure the blade server to simultaneously connect with a plurality of local and/or remote drives. The microprocessor routes data packets between a management system and its respective blade server, while a management module in the management system manages the simultaneous access of the drive(s) by the plurality of blade servers or the plurality of drives by a blade server. This increases the efficiency of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing simultaneous access between a storage drive and a plurality of blade servers, the method comprising:
    configuring the plurality of blade servers to simultaneously connect with the storage drive, wherein the plurality of blade servers is managed by a management system and the storage drive is coupled to the management system;
    each blade server of the plurality of blade servers simultaneously routing data packets between the management system and the blade server; and
    the management system managing simultaneous access of the plurality of blade servers to the storage drive, including routing the data packets received from the plurality of blade servers to the storage drive.

2. The method of claim 1, wherein configuring the plurality of blade servers to simultaneously connect with the storage drive includes configuring each of the plurality of blade servers to have a separate interface for communicating with the storage drive.

3. The method of claim 2, wherein each blade server of the plurality of blade servers simultaneously routing data packets between the management system and the blade server includes each blade server routing data packets to and from the management system in accordance with a Virtual Local Area Network (VLAN) protocol.

4. The method of claim 3, wherein the storage drive is one of a diskette drive or a CDROM drive.

5. The method of claim 3, wherein:
    the storage drive is a remote storage drive relative to the management system, the remote storage drive being coupled to a remote system that is in communication with the management system through a network; and
    the management system managing shared access of the plurality of blade servers to the storage drive includes the management system uploading an applet to the remote system, the applet establishing a connection between the remote storage drive and each blade server of the plurality of blade servers.

6. A system comprising:
    a management system;
    a storage drive connected to the management system; and
    a plurality of blade servers managed by the management system,
    wherein each blade server of the plurality of blade servers is configured to simultaneously connect with the storage drive and route data packets between the management system and the blade server, and wherein the management system manages simultaneous access of the plurality of blade servers to the storage drive, including routing the data packets received from the plurality of blade servers to the storage drive.

7. The system of claim 6, wherein each of the plurality of blade servers is configured to have a separate interface for communicating with the storage drive.

8. The system of claim 7, wherein each blade server of the plurality of blade servers simultaneously routes data packets between the management system and the blade server in accordance with a Virtual Local Area Network (VLAN) protocol.

9. The system of claim 8, wherein the storage drive is one of a diskette drive or a CDROM drive.

10. A computer readable medium encoded with a computer program for providing simultaneous access between a storage drive and a plurality of blade servers, the computer program comprising computer executable instructions for:
    configuring the plurality of blade servers to simultaneously connect with the storage drive, wherein the plurality of blade servers is managed by a management system and the storage drive is coupled to the management system;
    each blade server of the plurality of blade servers simultaneously routing data packets between the management system and the blade server; and
    the management system managing simultaneous access of the plurality of blade servers to the storage drive, including routing the data packets received from the plurality of blade servers to the storage drive.

11. The computer readable medium of claim 10, wherein the computer executable instructions for configuring the plurality of blade servers to simultaneously connect with the storage drive include computer executable instructions for configuring each of the plurality of blade servers to have a separate interface for communicating with the storage drive.

12. The computer readable medium of claim 11, wherein the computer executable instructions for each blade server of the plurality of blade servers simultaneously routing data packets between the management system and the blade server includes each blade server routing data packets to and from the management system in accordance with a Virtual Local Area Network (VLAN) protocol.

13. The computer readable medium of claim 12, wherein the storage drive is one of a diskette drive or a CDROM drive.

14. The computer readable medium of claim 12, wherein:
    the storage drive is a remote storage drive relative to the management system, the remote storage drive being coupled to a remote system that is in communication with the management system through a network; and
the computer executable instructions for the management system managing shared access of the plurality of blade servers to the storage drive include computer executable instructions for the management system uploading an applet to the remote system, and the applet establishing a connection between the remote storage drive and each blade server of the plurality of blade servers.

* * * * *